United States Patent
Garcia Martin et al.

(10) Patent No.: US 9,522,504 B2
(45) Date of Patent: Dec. 20, 2016

(54) METHOD FOR MANUFACTURING AN INTEGRATED COMPOSITE TRAILING EDGE AND INTEGRATED COMPOSITE TRAILING EDGE

(71) Applicant: Airbus Operations S.L., Getafe (ES)

(72) Inventors: Diego Garcia Martin, Getafe (ES); Julio Nunez Delgado, Getafe (ES); Lara Barroso Fernandez, Getafe (ES)

(73) Assignee: Airbus Operations S.L., Getafe (ES)

( * ) Notice: Subject to any disclaimer, the term of this patent is extended or adjusted under 35 U.S.C. 154(b) by 1 day.

(21) Appl. No.: 14/551,589

(22) Filed: Nov. 24, 2014

(65) Prior Publication Data

US 2015/0144737 A1 May 28, 2015

(30) Foreign Application Priority Data

Nov. 28, 2013 (EP) ..................................... 13382482

(51) Int. Cl.
*B29C 70/30* (2006.01)
*B29C 70/38* (2006.01)
(Continued)

(52) U.S. Cl.
CPC ............. *B29C 70/30* (2013.01); *B29C 70/088* (2013.01); *B29C 70/342* (2013.01); *B29C 70/38* (2013.01); *B29C 70/541* (2013.01); *B29C 70/865* (2013.01); *B29D 99/0014* (2013.01); *B32B 37/1018* (2013.01); *B32B 37/16* (2013.01); *B64C 3/28* (2013.01); *B29C 70/382* (2013.01); *B29C 70/386* (2013.01); *B29L 2031/3085* (2013.01); *B32B 2305/076* (2013.01); *B32B 2307/732* (2013.01); *B32B 2309/68* (2013.01); *B32B 2605/18* (2013.01); *Y02T 50/433* (2013.01); *Y10T 156/1089* (2015.01)

(58) Field of Classification Search
CPC ...... B29C 70/386; B29C 70/382; B29C 70/30; B29C 70/38; B29C 70/44
See application file for complete search history.

(56) References Cited

U.S. PATENT DOCUMENTS 3,028,292 A * 4/1962 Hinds ................... B29C 70/345
                                                        156/214
4,053,667 A * 10/1977 Smith ................... B29C 70/342
                                                        138/144

(Continued)

FOREIGN PATENT DOCUMENTS

FR       2946009         12/2010
WO       2012007780      1/2012

OTHER PUBLICATIONS

European Search Report, May 7, 2014.

*Primary Examiner* — Matthew Daniels
(74) *Attorney, Agent, or Firm* — Greer, Burns & Crain Ltd.

(57) ABSTRACT

An integrated composite trailing edge and its method of manufacturing. The trailing edge comprises an integrated main structure having an upper cover, lower flanges, and a set of ribs extending between the upper cover and the lower flanges, with a set of sandwich type lower panels attachable to the lower flanges of the integrated main structure. The method comprises the steps of providing a set of prepreg laminated preforms over a set of tool modules having a hollow so that each laminated configures a double C-shaped laminated preform having an upper section with a recess, two primary and secondary flanges, the upper section partly forming the upper cover, the two primary flanges partly forming the ribs and the two secondary flanges forming the lower flanges.

10 Claims, 4 Drawing Sheets

(51) Int. Cl.
*B32B 37/16* (2006.01)
*B32B 37/10* (2006.01)
*B29C 70/86* (2006.01)
*B29D 99/00* (2010.01)
*B64C 3/28* (2006.01)
*B29C 70/34* (2006.01)
*B29C 70/54* (2006.01)
*B29C 70/08* (2006.01)
*B29L 31/30* (2006.01)

(56) References Cited

U.S. PATENT DOCUMENTS

| | | | | |
|---|---|---|---|---|
| 4,475,976 A * | 10/1984 | Mittelstadt | ............ | B29C 70/342 100/211 |
| 4,633,632 A * | 1/1987 | Sarh | ............ | B21J 15/142 52/245 |
| 5,286,438 A * | 2/1994 | Dublinski | ............ | B29C 33/30 264/220 |
| 5,490,472 A * | 2/1996 | Hulse | ............ | B29C 53/584 114/357 |
| 5,547,629 A * | 8/1996 | Diesen | ............ | B29C 33/505 264/257 |
| 5,817,269 A * | 10/1998 | Younie | ............ | B29C 33/38 249/82 |
| 6,231,941 B1 * | 5/2001 | Cundiff | ............ | B29C 70/083 428/36.3 |
| 6,475,320 B1 * | 11/2002 | Masugi | ............ | B29C 70/48 156/189 |
| 2002/0031641 A1 * | 3/2002 | George | ............ | B32B 5/12 428/105 |
| 2012/0061515 A1 * | 3/2012 | Remene | ............ | B29C 70/30 244/123.1 |
| 2013/0115429 A1 | 5/2013 | Valle | | |
| 2013/0154154 A1 * | 6/2013 | Rodman | ............ | B29C 43/003 264/257 |

* cited by examiner

METHOD FOR MANUFACTURING AN INTEGRATED COMPOSITE TRAILING EDGE AND INTEGRATED COMPOSITE TRAILING EDGE

CROSS-REFERENCES TO RELATED APPLICATIONS

This application claims the benefit of the European patent application No. 13382482.1 filed on Nov. 28, 2013, the entire disclosures of which are incorporated herein by way of reference.

FIELD OF THE INVENTION

The present invention refers to an integrated composite trailing edge and to its manufacturing method.

BACKGROUND OF THE INVENTION

In the past, aircraft were mostly or totally built up with metallic components, providing a good performance in terms of mechanical behavior but, as a drawback, they are penalized in terms of weight.

One of the most important solutions was the use of composite fiber reinforced polymers (CFRP) for major structural parts, achieving an important weight savings and cost operations decrease.

Composites have been demonstrated to fulfill the following requirements:
  Weight savings.
  Be cost effective.
  Meet structural requisite under aircraft conditions.
  Beneficial cost/weight relation.

A horizontal tail plane (HTP) is a structure comprising a center structural box section, called a torsion box and two outer sections, the forward section known as the leading edge and the rearward section known as the trailing edge.

Trailing edges are the transition between the torsion box and the control surfaces. Trailing edges usually comprise an upper cover and a lower cover, both formed by a set of panels.

These panels are sandwich type panels. Standard architecture also includes of a set of ribs extending between the upper cover and the lower cover. These ribs are of two kinds, bearing ribs and trailing edge ribs. Trailing edge ribs are optional and therefore a trailing edge without these ribs is possible. Bearing ribs hold the hinge line of the control surfaces while trailing edge ribs are used to provide stability to the trailing edge structure.

Upper panels are joined to the ribs by means of rivets while lower panels are joined by means of screws to a lower flange of the ribs, so the panels which make up the lower cover can be opened to gain access for maintenance tasks of elements such as systems, actuators or fittings.

A known method for manufacturing said elements uses prepreg technology. Each of the different components is manufactured separately, including lay-up, forming and curing processes. Afterwards they are assembled together and joined by means of rivets.

Drawbacks of the known structure are the weight of the rivets used to join the different components and the amount of time needed for the assembly process due to the fact that it includes not only providing a large number of elements but also the need to link these elements together.

SUMMARY OF THE INVENTION

The above mentioned drawbacks are solved by the claimed method and trailing edge which provides advantages in terms of manufacturing and assembly.

The trailing edge of the claimed invention comprises an integrated main structure and a set of removable sandwich type lower panels attached to the integrated main structure. The integrated main structure comprises an upper cover, lower flanges, and a set of ribs extending between the upper cover and said lower flanges while the removable lower panels are attached to said lower flanges.

The claimed method comprises the following steps:

Providing a set of prepreg laminated preforms of composite material over a set of tool modules, said tool modules having a hollow located at their upper part for receiving a sandwich core. The tool modules are configured so that each prepreg laminated perform configures a double C-shaped laminated preform having an upper section with a recess corresponding with the hollow, two primary flanges and two secondary flanges. The upper section is configured for partly forming a segment of the upper cover of the integrated main structure, the two primary flanges are configured for partly forming the ribs and the two secondary flanges are configured for forming the lower flanges of the integrated main structure.

Providing a set of sandwich cores into the recesses of the double C-shaped laminated preforms.

Aligning the set of tool modules so that adjacent primary flanges are located together.

Providing rovings to fill up the space in the radii between adjacent primary flanges.

Providing a prepreg laminate on top of the aligned set of tool modules.

Providing lower prepreg laminates against two consecutive secondary flanges.

Applying a curing process to co-cure said laminated preforms so that the integrated main structure of the trailing edge is formed.

The prepreg laminates of composite material can be a flat laminate manufactured by means of manual or automatic lay-up followed by the forming process of the double C-shaped laminated preforms and its recesses by, for instance, a hot-forming or a press-forming process. In other embodiments, the composite material can be directly shaped on the tool module by, for example, a fiber placement process obtaining a double C shape and a recess for receiving the sandwich core.

The term "laminated preform" as used in this document designates a composite item that requires an individual forming process such as hot-forming, press-forming, to form it with certain characteristics and that is intended to be integrated with other elements in the manufacturing process of the product to which it belongs. As previously stated, the laminated preforms can also be made directly with the final shape by means of an automatic fiber placement machine, locating the carbon fiber over the curing tooling which will be integrated with the whole set.

An important aspect of the present invention is that each laminated preform partially forms various components of a trailing edge known in the state of the art. As previously stated, each laminated preform forms part of the upper cover, part of a rib and part of a lower flange forming the lower cover. Moreover, each component of a traditional trailing edge is formed from several laminated performs, for instance, a rib is formed by joining two primary flanges of two laminated performs.

The main advantage of the claimed method over conventional methods is based on the reduction of the manufacturing and assembly operations, because thanks to the claimed method, a single curing step is applied to the whole piece contrary to independently curing every part. Another advantage is that it is possible to obtain the piece without the need for rivets between ribs and covers. This will also reduce weight due to the elimination of these mechanical bonds. This leads to high and optimum integration of the trailing edge and to a reduction of costs and weight, increasing or maintaining its structural characteristics.

Therefore, said method not only reduces the assembly process but also the manufacturing process and more specifically the manufacturing and assembly steps close to the final steps of manufacturing and assembly. Additionally the same tool module is used throughout the whole manufacturing process.

It has to be taken into account that the lower cover and its panels must be removable for inspection and it is manufactured as known in the state of the art. In fact, the integrated structure object of the invention splits fixed parts, for instance, ribs, upper cover from removable parts such as lower covers.

It is also an object of the present invention to provide an aircraft composite trailing edge comprising an integrated main structure and a set of removable sandwich type lower panels attached to the integrated main structure. The integrated main structure comprises an upper cover, lower flanges, and a set of ribs extending between the upper cover and said lower flanges, while the removable lower panels are attached to said lower flanges.

The composite trailing edge also comprises:
a set of double C-shaped laminated preforms made of prepreg laminate preforms of composite material having an upper section with a recess, two primary flanges and two secondary flanges, the upper section configured for partly forming a segment of the upper cover of the integrated main structure, the two primary flanges configured for partly forming the ribs and the two secondary flanges configured for forming the lower flanges of the integrated main structure, the set of double C-shaped laminated preforms located aligned such that adjacent primary flanges are located together, a set of rovings located to fill up the space in the radii between adjacent primary flanges, a prepreg laminate located on top of the set of double C-shaped preforms, a set of sandwich cores located into the recesses of the double C-shaped laminated preforms, lower prepreg laminates located against two consecutive secondary flanges, the set of double C-shaped laminated preforms, the prepeg laminate and the sandwich cores forming an integrated structure manufactured by the previously described method.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprises the following figures.

DETAILED DESCRIPTION OF THE PREFERRED EMBODIMENTS

Figure 1:
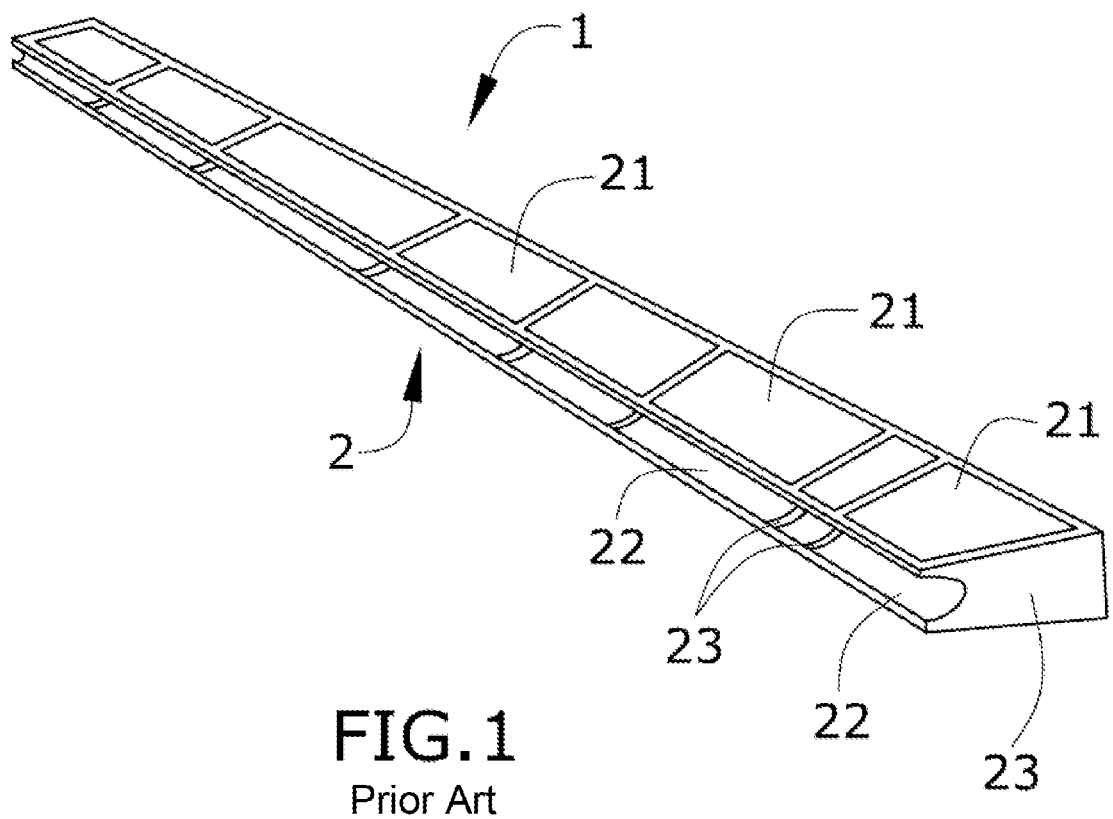
FIG. 1 is a schematic perspective view of a trailing edge of the state of the art.

FIG. 1 shows a trailing edge of the state of the art. The known trailing edge comprises, as previously explained in the background of the invention:
an upper cover (1) formed by a set of sandwich type upper panels (21),
lower cover (2) formed by a set of sandwich type lower panels (22),
a set of transversal ribs (23) extending between the upper and the lower covers (1, 2).

In contrast, the trailing edge of the claimed invention comprises the integrated main structure and the set of removable sandwich type lower panels (22) attached to the integrated main structure. The integrated main structure comprises the upper cover (1), the lower flanges, and the set of ribs (23) extending between the upper cover (1) and the lower flanges while the removable sandwich lower panels (22) are attached to said lower flanges.

A tool module (7) of the invention comprises an upper part having a hollow (9) for accommodating a sandwich core (5). A prepreg laminate is formed over the tool module (7) configuring a double C-shaped laminated preform (10) having an upper section (15) with a recess (16) corresponding with a hollow (9) of the tool module (7), two primary flanges (3) and two secondary flanges (8). The upper section (15) will configure part of the upper cover (1) of the trailing edge, the two primary flanges (3) will configure part of the ribs (23) and the two secondary flanges (8) will configure the lower flange of the trailing edge.

Figure 2:
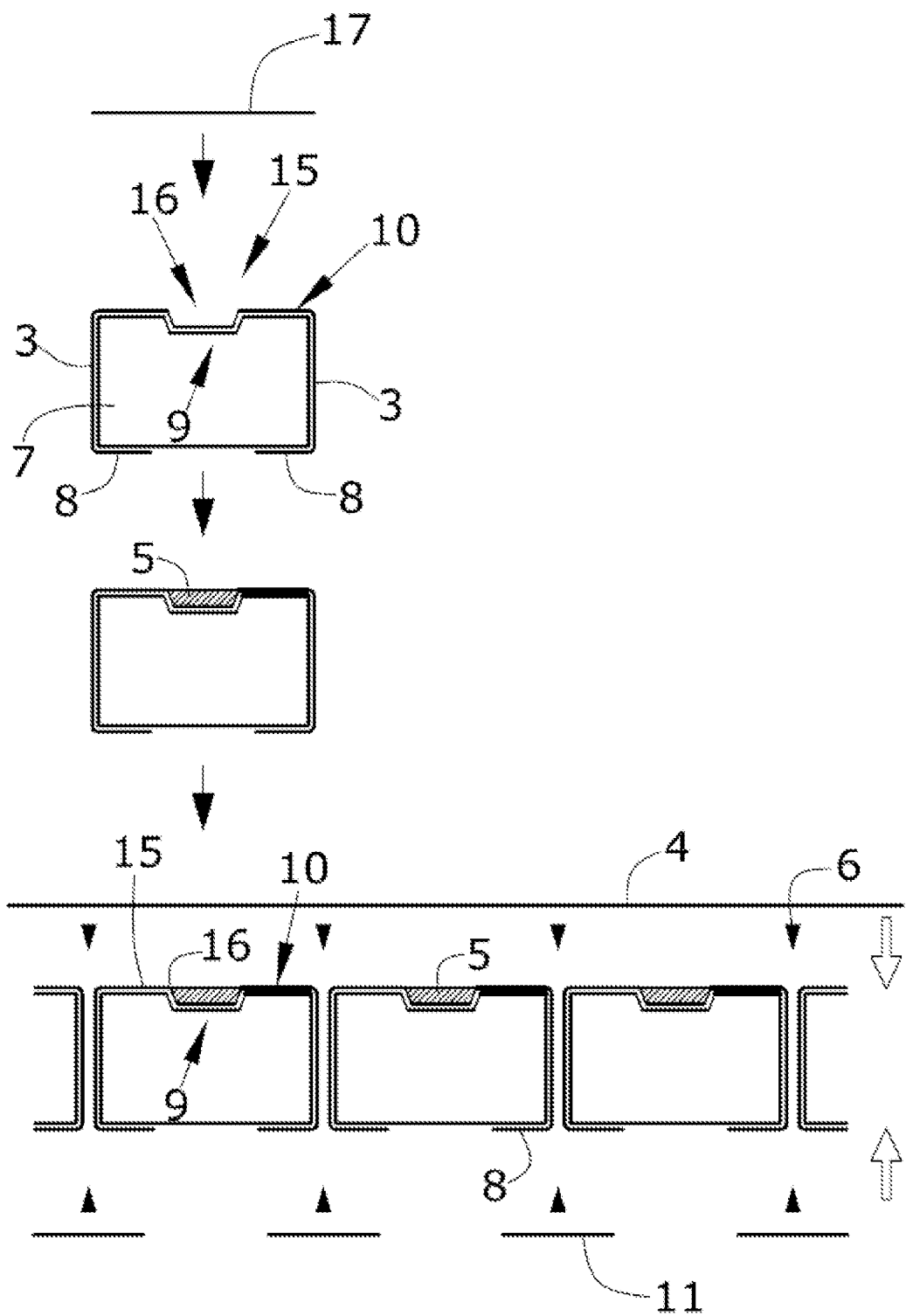
FIG. 2 is a schematic manufacturing process of an embodiment of the invention.

For forming the double C-shaped preforms (10) and the recesses (16) for accommodating the sandwich core (5), two different embodiments are possible. FIG. 2 shows an embodiment of the process of the manufacturing method of the invention. A first flat laminate (17) is provided and located over the tool module (7); said flat laminate (17) can be compacted during lay-up. The forming process configures the double C shape and also its recess (16) by for instance a hot-forming or a press-forming process.

A second embodiment includes directly shaping the laminate against the tool module (7). In this second embodiment, two different methods are possible, by an automatic tape laying machine (ATL) or by means of fiber placement.

Fiber placement allows directly shaping over the tool module (7) both the recess (16) and the double C shape. Fiber placement allows bigger slopes in the recess (16), therefore said recess (16) can be directly taped by fiber placement.

To the contrary, automatic tape laying machines (ATL) have limits on slopes that can be taped, therefore the recess (16) and the double C shape might have to be formed by a forming process, i.e., hot forming or press-forming. ATL allows directly shaping the upper section (15) over the tool module (7) and afterwards forming the double C shape. Therefore a flat laminate (17) is layed up onto the upper section (15) of the tool module (7) by an automatic tape laying machine to obtain a flat laminate with the shape of the recess (16) and by then applying a forming process in order to achieve the double C shape.

To ensure good compaction in the area of the hollow (9), the upper section (15) can be made with the shape of the hollow (9) and, for instance, during the hot forming of the double C shape, finishing the formation of the recess (16) with a male tool (13) or air ports (14), as it will be explained below, to make sure that the recess (16) follows the shape of the hollow (9). Previously shaping the laminate with the shape of the hollow (9), and afterwards finishing the recess (16), is more effective than fully forming the recess (16).

Forming this type of double-C shaped preform (10) is not known because in addition to said double-C shaped preform (10), a recess (16) has to be formed which is a more complex task due to the sharp inner corners of the hollow (9), because the laminate has to accurately follow the shape of the tool module (7).

Figure 3:
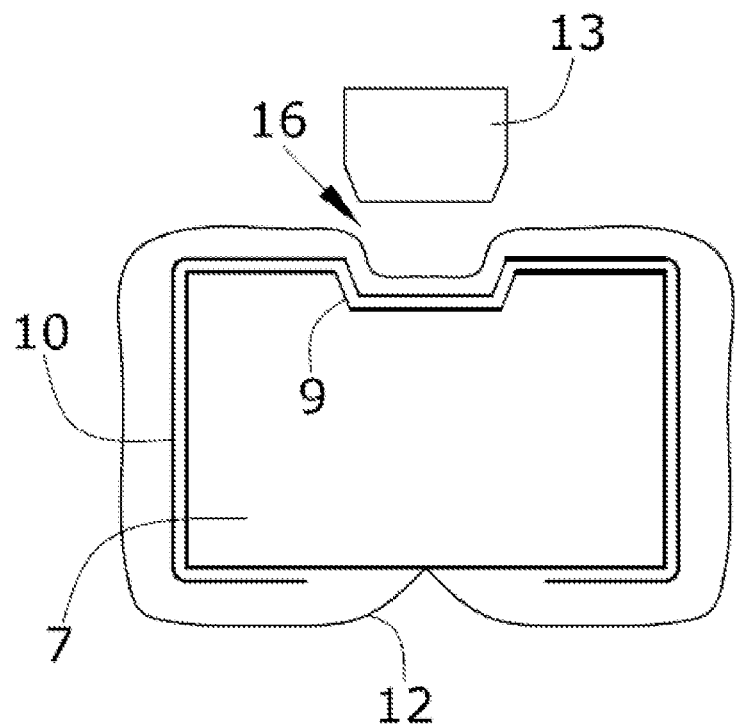
FIG. 3 is a schematic manufacturing process of an embodiment for forming the laminated preforms, including the primary and secondary flanges and the recess.

FIG. 3 shows an embodiment in which, during the forming process, a membrane (12) is located over the tool module (7) and said membrane (12) is pressed against the tool module (7) by means of vacuum, for instance, provided by a general air port. A male tool (13) presses the prepreg laminate against the hollow (9) of the tool module (7) for forming the recess (16) or finishing said recess (16) in case the upper section (15) had previously been made with the shape of the hollow (9).

Figure 4:
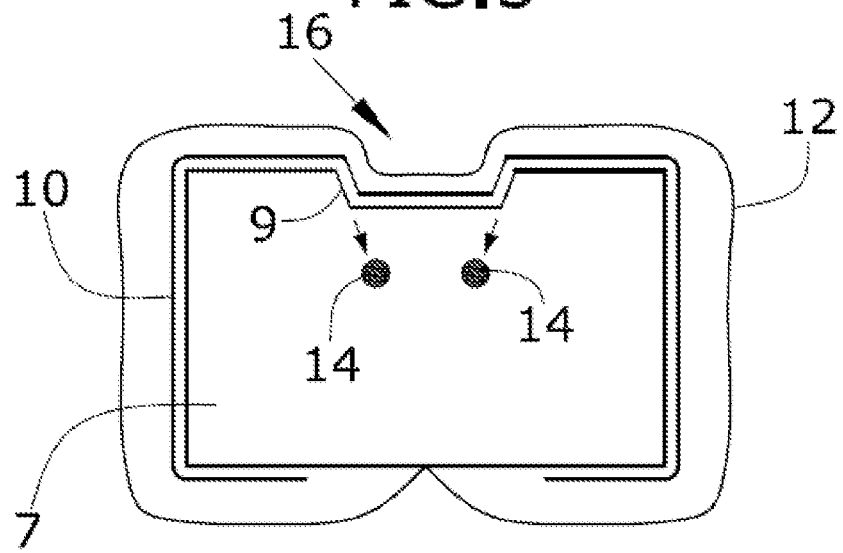
FIG. 4 is another embodiment of the manufacturing process for forming the laminated preforms, including the primary and secondary flanges and the recess.

FIG. 4 shows a different embodiment for forming the recess (16) of the double C-shaped laminated preform (10). This embodiment comprises at least two air ports (14) located close to the hollow (9) of the tool module (7), therefore located close to the target area. In this second embodiment, the male tool (13) is not needed due to the location of the two air ports (14) close to the inner corners of the hollow (9).

After providing the double C-shaped preform (10) over the tool modules (7), the sandwich core (5) is positioned into the recess (16) of the upper section (15) of the double C-shaped preform (10).

Following the deposition of the sandwich core (5), all the double C-shaped laminated preforms (10) and their corresponding tool modules (7) are aligned together so that primary flanges (3) of adjacent preforms are located against each other. Two adjacent primary flanges (3) will configure a rib (23) of the trailing edge.

Additionally, FIG. 2 also shows that before providing the further prepreg laminate (4), rovings (6) are provided into the joints of two double C-shape laminated preforms (10) of two adjacent tool modules (7). The manufacturing of the rovings (6) can be performed manually or automatically. The rovings (6) are used to fill up the space in the radii that are created between adjacent primary flanges (3). Before the curing process, lower prepreg laminates (11) are provided against two consecutive secondary flanges (8). The lower panels (22), which are removable, will be joined to the secondary flanges (8) and the lower prepreg laminates (11).

A further prepreg laminate (4) is provided on top of the aligned set of tool modules (7) and finally a curing process is applied to co-cure said laminated preforms so that the integrated trailing edge main structure is formed.

Figure 5:
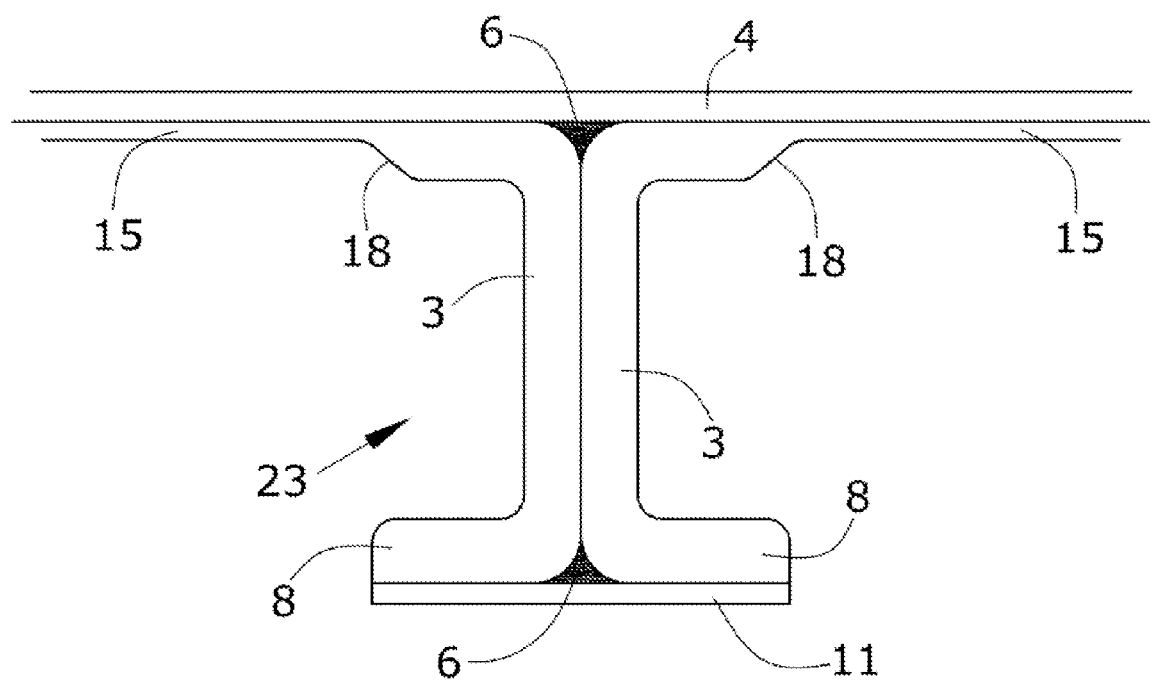
FIG. 5 is a schematic view of two adjacent primary flanges, secondary flanges and upper sections.

The double C-shaped preform (10) is thicker adjacent to the corners between the primary flanges (3) and the upper section (15), the primary flanges (3) and the secondary flanges (8) and along the primary flanges (3). This is due to the fact that ribs (23) are required to have a greater thickness for their higher structural demand. FIG. 5 shows a thickness change (18) located in the proximity of the corner between the primary flanges (3) and the upper section (15), the thickness change (18) corresponds to the transition between the thickness of the upper section (15) and of the ribs (23).

The same tool modules (7) are finally cured together. The tool modules (7) comprise modules that will fit together as a puzzle in order to create the right compaction parameters.

The demolding of the kit must be performed carefully avoiding any damage to the structure. As the trailing edge has a conical shape, the demolding must be performed oriented to the front direction which is the HTP RS direction. In addition, the tool modules (7) can be made of aluminum which helps the demolding process due to the thermal contraction. A single approach could be a demolding in the RS direction. But, due to the complexity that the sandwich core (5) involves related to the thickness change in the upper cover (1), it is more practical to divide the tooling to ease the demolding process.

To improve the buckling behavior of the panels, a Z shape profile can be riveted to the structure. They are placed at the rear end of the top panel to improve their buckling behavior.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for manufacturing an integrated composite trailing edge of an aircraft, the trailing edge comprising:
    an integrated main structure comprising:
        an upper cover,
        lower flanges, and
        a set of ribs extending between the upper cover and the lower flanges, and
    a set of sandwich type lower panels attachable to the lower flanges of the integrated main structure,
    the method comprising the following steps:
    a) providing a set of prepreg laminated preforms of composite material over a set of tool modules, said tool modules having a hollow located at their upper part for receiving a sandwich core, the tool modules being configured so that each prepreg laminated preform configures a double C-shaped laminated preform having an upper section with a recess corresponding with the hollow, two primary flanges and two secondary flanges, the upper section configured for partly forming a segment of the upper cover of the integrated main structure, the two primary flanges configured for partly forming the ribs and the two secondary flanges configured for forming the lower flanges of the integrated main structure,
    b) providing a set of sandwich cores into the recesses of the double C-shaped laminated preforms,
    c) aligning the set of tool modules so that adjacent primary flanges are located together,
    d) providing rovings to fill up the space in the radii between adjacent primary flanges,
    e) providing a prepreg laminate on top of the aligned set of tool modules,
    f) providing lower prepreg laminates against two consecutive secondary flanges, and
    g) applying a curing process to co-cure said laminated preforms so that the integrated main structure of the trailing edge is formed, wherein, during the forming process, a membrane is located over the tool module being pressed against the tool module by means of the vacuum provided by a general air port, while a male tool presses the flat prepreg laminate against the hollow of the tool module for forming the recess of the C-shaped laminated preform, wherein, during the forming process, a membrane is located over the tool module, the membrane being pressed against the tool module for forming the recess of the C-shaped laminated preform by means of a vacuum provided by at least two air ports located in the proximity of the hollow.

2. The method according to claim 1, wherein, during the forming process, a membrane is located over the tool module being pressed against the tool module by means of the vacuum provided by a general air port, while a male tool presses the flat prepreg laminate against the hollow of the tool module for forming the recess of the C-shaped laminated preform.

3. The method according to claim 1, wherein the two air ports are located in the proximity of each of the inner corners of the hollow.

4. The method according to claim 1, wherein
wherein the double C-shaped laminated preform is formed by lying up a flat prepreg laminate onto the upper section of the tool module by an automatic tape laying machine to obtain a flat laminate with the shape of the recess and then applying a forming process in order to achieve the double C shape.

5. The method according to claim 1, wherein the double C-shaped prepreg laminated preform and its recess are formed by directly laying up a laminate over the tool module by means of a fiber placement machine.

6. A method for manufacturing an integrated composite trailing edge of an aircraft, the trailing edge comprising:
an integrated main structure comprising:
an upper cover,
lower flanges, and
a set of ribs extending between the upper cover and the lower flanges, and
a set of sandwich type lower panels attachable to the lower flanges of the integrated main structure,
the method comprising the following steps:
a) providing a set of prepreg laminated preforms of composite material over a set of tool modules, said tool modules having a hollow located at their upper part for receiving a sandwich core, the tool modules being configured so that each prepreg laminated perform configures a double C-shaped laminated preform having an upper section with a recess corresponding with the hollow, two primary flanges and two secondary flanges, the upper section configured for partly forming a segment of the upper cover of the integrated main structure, the two primary flanges configured for partly forming the ribs and the two secondary flanges configured for forming the lower flanges of the integrated main structure,
b) providing a set of sandwich cores into the recesses of the double C-shaped laminated preforms,
c) aligning the set of tool modules so that adjacent primary flanges are located together,
d) providing rovings to fill up the space in the radii between adjacent primary flanges,
e) providing a prepreg laminate on top of the aligned set of tool modules,
f) providing lower prepreg laminates against two consecutive secondary flanges, and
g) applying a curing process to co-cure said laminated preforms so that the integrated main structure of the trailing edge is formed,
wherein the double C-shaped laminated preform is formed by lying up a flat prepreg laminate onto the upper section of the tool module by an automatic tape laying machine to obtain a flat laminate with the shape of the recess and then applying a forming process in order to achieve the double C shape,
wherein, during the forming process, the recess is finished by positioning a membrane over the tool module, the membrane being pressed against the tool module by means of the vacuum provided by at least two air ports located in a proximity of the hollow.

7. The method according to claim 6, wherein the double C-shaped laminated preform is formed by providing a flat prepreg laminate over the tool module followed by a forming process of said flat laminate over the tool module for forming the double C shape and the recess.

8. The method according to claim 6, wherein the two air ports are located in the proximity of each of the inner corners of the hollow.

9. The method according to claim 6, wherein, during the forming process, the recess is finished by positioning a membrane over the tool module, the membrane being pressed against the tool module by means of the vacuum provided by an air port and by pressing a male tool against the hollow of the tool module.

10. The method according to claim 6, wherein the double C-shaped prepreg laminated preform and its recess are formed by directly laying up a laminate over the tool module by means of a fiber placement machine.

* * * * *